United States Patent
Huber et al.

(10) Patent No.: US 11,217,242 B2
(45) Date of Patent: Jan. 4, 2022

(54) DETECTING AND ISOLATING COMPETING SPEECH FOR VOICE CONTROLLED SYSTEMS

(71) Applicant: Ford Global Technologies, LLC, Dearborn, MI (US)

(72) Inventors: John Huber, Novi, MI (US); Joshua Wheeler, Trenton, MI (US); Scott Andrew Amman, Milford, MI (US); Ranjani Rangarajan, Farmington Hills, MI (US); Leah Busch, Berkley, MI (US); Nikhitha Bekkanti, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 159 days.

(21) Appl. No.: 16/419,984

(22) Filed: May 22, 2019

(65) Prior Publication Data

US 2020/0372908 A1 Nov. 26, 2020

(51) Int. Cl.
*G10L 15/22* (2006.01)
*B60R 16/037* (2006.01)

(52) U.S. Cl.
CPC .......... *G10L 15/22* (2013.01); *B60R 16/0373* (2013.01); *G10L 2015/223* (2013.01)

(58) Field of Classification Search
CPC ................................................. B60R 16/0373
USPC .......... 704/246, 247, 251, 252, 275
See application file for complete search history.

(56) References Cited

U.S. PATENT DOCUMENTS

| | | | |
|---|---|---|---|
| 6,496,107 B1 | 12/2002 | Himmelstein | |
| 6,906,632 B2 | 6/2005 | DeLine et al. | |
| 9,800,983 B2 | 10/2017 | Wacquant et al. | |
| 10,102,702 B1 | 10/2018 | Wheeler et al. | |
| 10,475,466 B2* | 11/2019 | Charette | G10L 25/93 |
| 2003/0020603 A1* | 1/2003 | DeLine | B60R 1/12 340/425.5 |
| 2005/0156753 A1* | 7/2005 | DeLine | G07F 7/0886 340/693.5 |
| 2014/0112496 A1 | 4/2014 | Murgia et al. | |
| 2016/0019890 A1* | 1/2016 | Amman | G10L 15/20 704/233 |
| 2017/0150254 A1* | 5/2017 | Bakish | H04R 1/326 |
| 2018/0233129 A1* | 8/2018 | Bakish | G10L 25/06 |
| 2018/0332389 A1* | 11/2018 | Ekkizogloy | G10L 15/26 |

(Continued)

OTHER PUBLICATIONS

Lin, et al., "Adasa: a Conversational In-vehicle Digital Assistant for Advanced Driver Assistance Features," (Research Paper), Proceedings of the 31st Annual ACM Symposium on User Interface Software and Technology, Oct. 14-17, 2018, Berlin, Germany (12 pages). DOI: https://doi.org/10.1145/3242587.3242593.

*Primary Examiner* — Leonard Saint Cyr
(74) *Attorney, Agent, or Firm* — Frank Lollo; Eversheds Sutherland (US) LLP

(57) ABSTRACT

Detecting and isolating competing speech for voice controlled systems are provided herein. An example method includes isolating a voice command from a plurality of competing voice sound signals received internally or externally to a vehicle, wherein at least a portion of the plurality of competing voice sound signals are received using a sensor coupled with a window of the vehicle, and processing the voice command by the voice command system.

20 Claims, 4 Drawing Sheets

(56) References Cited

U.S. PATENT DOCUMENTS

2019/0106069 A1    4/2019  Wheeler et al.
2020/0047687 A1*   2/2020  Camhi .................... G10L 15/22

* cited by examiner

DETECTING AND ISOLATING COMPETING SPEECH FOR VOICE CONTROLLED SYSTEMS

TECHNICAL FIELD

The present disclosure relates to voice controlled systems and methods for use in a vehicle environment. In some embodiments, the present disclosure utilizes a plurality of sound signal sensing mechanisms including a microphone within a vehicle, as well as window microphone(s). Voice commands may be isolated from competing speech using aspects of the present disclosure.

BACKGROUND

Using a voice-based digital assistant while speaking from outside the vehicle is disclosed in U.S. Patent Pub. No. 20190106069, which includes using piezoelectric sensors attached to vehicle glass to detect vibrations from pressure waves as the user speaks, turning the glass into a microphone. While the system is very effective at picking up the exterior customer's voice, the sensor element picks up pressure waves on both sides of the glass, and cannot determine if the voice detected came from outside the vehicle or inside the vehicle. This can be important if there are occupants inside the vehicle talking while a person outside the vehicle is trying to use the voice-based digital assistant, for example asking the car what the tire pressure should be, or requesting the lift gate to open. Another example might be in an autonomous vehicle situation, if the vehicle needs authentication information from the person standing outside the vehicle while ride-sharing passengers inside the vehicle may be talking to one another or on their phone. In the domain of automatic speech recognition (ASR) this is classified as competing speech.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to detect competing speech from a plurality of sound signals and isolate a voice command from the plurality of sound signals. In some embodiments, the plurality of sound signals come from within the vehicle and at least one of the sound signals is external to the vehicle. In various embodiments, a portion of the voices originate within the vehicle and a portion of the voices originate externally to the vehicle, and the portion of the voices external to the vehicle are isolated and processed as voice commands.

In some embodiments, the present disclosure leverages a traditional hands-free communication voice microphone on an interior of the vehicle as a first type of sound signal along with one or more sensors coupled to glass substrates of the vehicle such as windows as a second type of sound signal. The windows function as resonators that vibrate when individuals talking inside or outside the vehicle are generating sound signals.

In one example embodiment, the present disclosure can be used to isolate and remove interior voices from signals received by a glass microphone and an interior microphone. Since the outside voice may not be heard by the interior microphone when competing speech is present, the data from competing interior speech can be isolated and canceled. In various embodiments, this is accomplished using digital signal processing (DSP) through an Accessory Protocol Interface Module (APIM) of a vehicle controller or similar onboard vehicle processing device, with multi-channel digital signal processing such as a cross-correlation analysis between the traditional interior microphone (cleanly picking up interior voices) and the glass microphone (picking up a combination of interior and exterior voices). These and other advantages of the present disclosure are provided in greater detail herein.

ILLUSTRATIVE EMBODIMENTS

Figure 1:
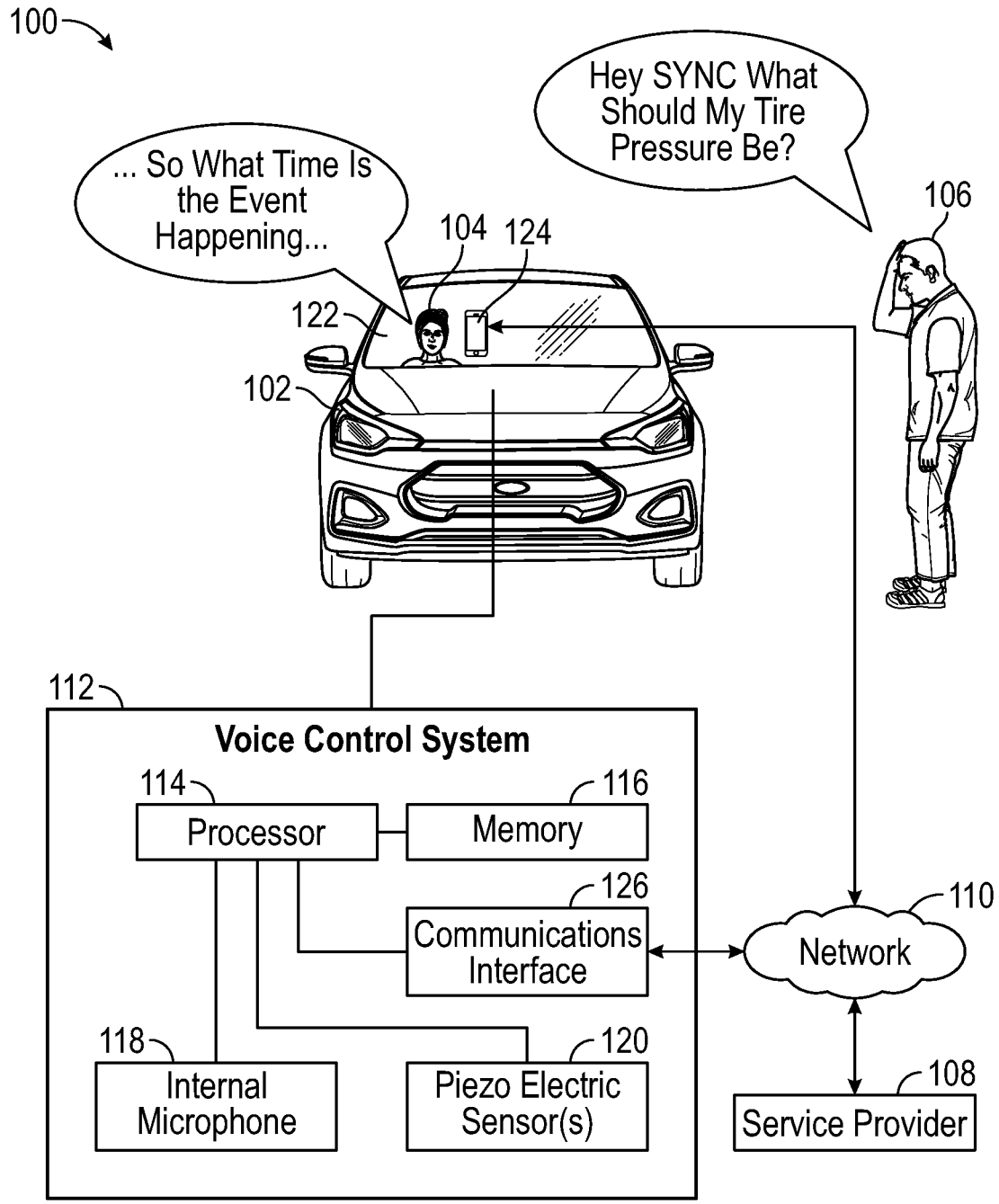
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The illustrative architecture 100 may include one or more vehicles such as a vehicle 102, one or more internal talkers such as internal talker 104 (e.g., second user or voice), one or more external talkers such as external talker 106 (e.g., first user or voice), a service provider 108, and a network 110. The network 110 may include any one or a combination of multiple different types of networks, such as cable networks, the Internet, wireless networks, and other private and/or public networks. In some instances, the network 110 may include cellular, Wi-Fi, or Wi-Fi direct. In some embodiments, some functionalities disclosed herein can be executed entirely at the vehicle level. In other embodiments, some functionalities disclosed herein can be executed cooperatively between the vehicle 102 and the service provider 108 or even a mobile device.

In various embodiments, the vehicle 102 comprises a voice control system 112. A driver can control various features of the vehicle 102 such as audio, navigation, climate control, and the like using the voice control system 112. To be sure, while embodiments disclosed herein can be utilized within the context of a vehicle such as a car, the aspects of competing speech filtering can be equally applied in any scenario where at least one microphone and at least a glass substrate-based microphone are present.

In some embodiments, the voice control system 112 comprises a processor 114 and memory 116. The memory 116 stores instructions that are executed by the processor 114 to perform aspects of the distracted condition analysis and warning disclosed herein. When referring to operations executed by the voice control system 112 it will be understood that this includes the execution of instructions by the processor 114.

In one example scenario, the voice control system 112 can receive a plurality of sound signals from within and external to the vehicle. A first portion of the plurality of sound signals is received using a sensor coupled with a window of the vehicle and a second portion of the plurality of sound signals is received by a microphone within a cabin of the vehicle.

For example, the vehicle 102 can include an internal microphone 118 that receives sound signals from the internal talker 104 who is positioned within a cabin of the vehicle 102. The sound signals can be received and processed by the voice control system 112 to control vehicle features such as navigation, climate control, function automation, and assistive features.

Similarly, the vehicle 102 also comprises one or more sensors such as piezoelectric sensors 120, which are coupled with one or more of the windows, such as window 122 of the vehicle. The window 122 can include any window or glass substrate of the vehicle 102. In some embodiments, piezoelectric sensors can be coupled with each glass substrate in the vehicle 102. The piezoelectric sensors 120 can be electrically coupled to the voice control system 112. The window 122 acts as a resonator and the piezoelectric sensors 120 sense vibrations of the window 122. In some embodiments, the voice control system 112 is configured to interpret these sound signals, turning the same into recognizable speech, which can include voice commands that are used by the voice control system 112 to control vehicle features. Additional details regarding the structure and use of the piezoelectric sensors 120 and the window 122 are disclosed in U.S. Patent Pub. No. 20190106069, which is hereby incorporated by reference herein in its entirety, including all references and appendices cited therein. In general, sound signals received by the piezoelectric sensors 120 and the window 122 are received from the external talker 106 (first user).

In various embodiments, competing speech created from the internal talker 104 can render it difficult or impossible for the external talker 106 to utilize the voice control system 112 to perform actions such as requesting a tire pressure or opening a lift-gate of the vehicle 102. In another example embodiment, the vehicle 102 is an autonomous vehicle. If the autonomous vehicle needs authentication information from the external talker 106 standing outside the vehicle, ride-sharing passengers inside the vehicle may be talking to one another or on their phone. This competing speech can make it impossible or at least very difficult for the voice control system 112 to decipher voice commands provided by the external talker 106 from ambient vocal noise. Again, this includes voice commands received by the piezoelectric sensors 120 and the window 122 from the external talker 106.

In one example use case, the voice control system 112 can be configured to receive a plurality of sound signals as disclosed above from within and externally to the vehicle 102. In this example, the external talker 106 is attempting to utilize the voice control system 112 to ascertain a tire pressure and/or fuel level of the vehicle 102. The sound signals produced by the external talker 106 are received through the piezoelectric sensors 120 coupled to the window 122. In some embodiments, this process is referred to as a first sound signal which is received from a first user who is external to the vehicle 102.

The internal talker 104 creates competing speech which is received by the internal microphone 118 and also the piezoelectric sensors 120 and the window 122. In one embodiment, competing speech could be created between two internal talkers within the cabin of the vehicle who are engaged in a conversation. This speech may compete with speech created by the external talker. That is, as the internal microphone 118 receives the competing speech, the internal talker 104 sound signals are also resonating against the window 122. This is referred to as a second sound signal that is received from a second user within the vehicle using both the microphone and the one or more sensors coupled with the window.

The voice control system 112 then applies digital signal processing techniques and cross-correlation analysis to isolate a voice command from the competing speech represented included in the plurality of sound signals. Broadly speaking, the voice control system 112 isolates sound signals received from: (1) the internal talker 104 from a combination of the internal microphone 118 on the interior of the vehicle, along with the piezoelectric sensors 120 coupled to the window 122; and (2) the external talker 106 using the piezoelectric sensors 120 coupled to the window 122. These data are analyzed to remove the interior voices/sound signal(s) from the exterior voice/sound signal(s) received from the external talker 106. The voice of the internal talker 104 may resonate the window 122 in a way that competes with the resonation of the window 122 by the external talker 106. The sound signals from competing interior speech measured by the internal microphone 118 and piezoelectric sensors 120 coupled to the window 122 can be canceled to isolate the voice command of the external talker 106.

Stated otherwise, competing speech from within the vehicle causes vibrations of the window 122, which create noise/competing speech that can be identified when the internal microphone 118 is used to also receive this internal competing speech. The sound signals received by the internal microphone 118 that substantially match the vibration patterns received by the piezoelectric sensors 120 coupled to the window 122 are removed or isolated as likely belonging to the internal talker 104. Thus, in one or more embodiments, the cross-correlation analysis can detect common data in the first portion and the second portion of a plurality of sound signals. In various instances, data that is not common between the first portion and the second portion is determined as the voice command.

Figure 2:
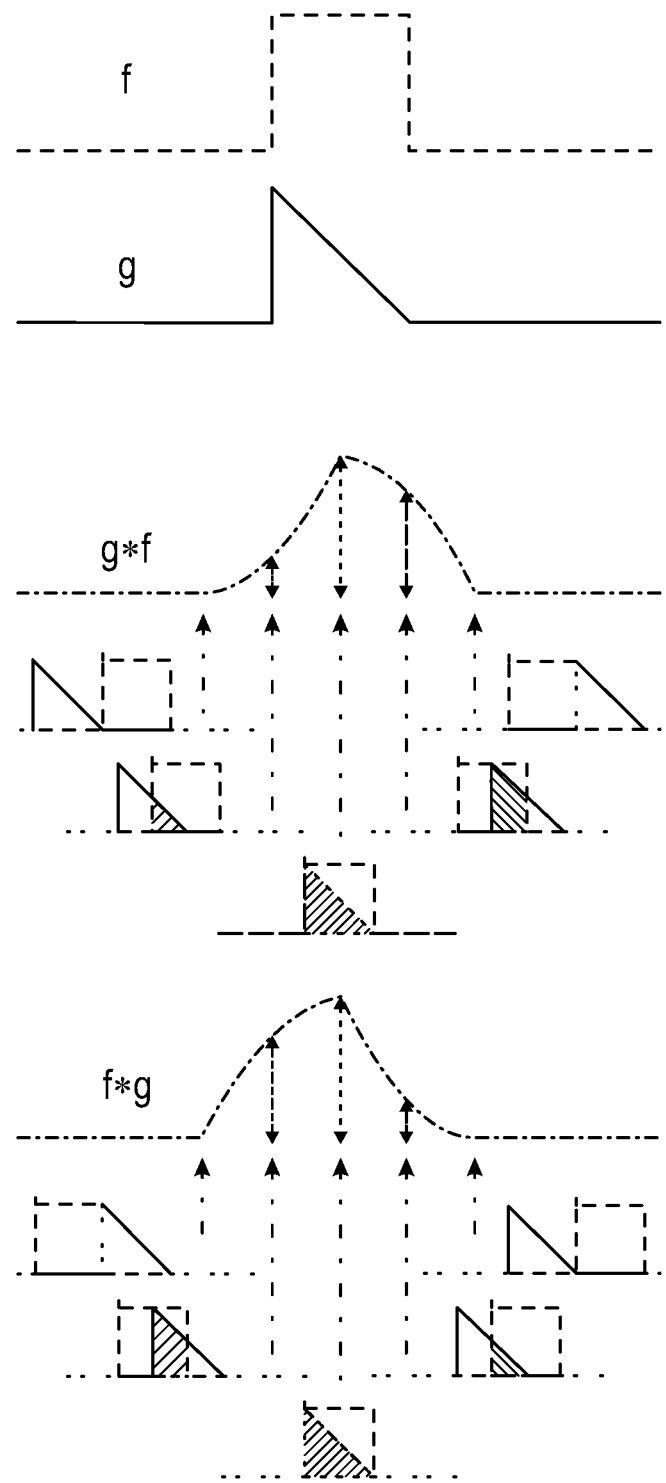
FIG. 2 is a graphical representation of an example cross-correlation analysis utilized in accordance with the present disclosure.

Turning now to FIG. 2, which graphically illustrates a process of cross-correlation to isolate voice commands from competing speech. The cross-correlation process is an example of multi-channel digital signal processing contemplated for use in accordance with the present disclosure. The graphed illustration comprises two sound signals f and g. The interior microphone data is f, and the exterior microphone data is g, the equation $g-(f*g)$ isolates the exterior voice of the external talker 106. This process can utilize the product of $(f*g)$ or $(g*f)$ as illustrated in FIG. 2. This process is generally referred to as isolating a voice command based on an analysis of a first portion of a plurality of sound signals and a second portion of the plurality of sound signals.

Similar cross-correlation processing can be used to selectively filter out an exterior voice of the external talker 106 which may be considered competing speech to an internal voice within the cabin of the vehicle 102. This process would allow for voice signals received by the internal microphone 118 to be preferentially selected and filtered from competing speech or road noise received by the piezoelectric sensors 120 coupled to the window 122. To be sure, cross-correlation analysis has been disclosed as an example method for filtering competing speech, other equivalent multi-channel digital signal processing methods that would provide similar output are likewise contemplated for use.

Ultimately, when the voice command is isolated, the voice command is then processed by the voice command system 112. In the example provided above, the voice command system 112 may obtain and output the tire pressure and/or fuel level of the vehicle 102.

While this process has been described as being performed by the voice command system 112, the digital signal processing and cross-correlation analyses disclosed herein can be performed by the service provider 108 or a mobile device 124, so long as these systems/devices are capable of receiving the plurality of sound signals from an internal microphone as well as the piezoelectric sensors 120 coupled to the window 122 and performing the requisite cross-correlation analyses. Thus, these methodologies can be enabled when using a microphone of the mobile device 124 as the internal microphone 118, if the vehicle does not possess an interior or internal microphone, or such device is damaged or inoperative.

The service provider 108 can include a cloud or server-based resource that provides the cross-correlation and voice command isolation functionalities disclosed above. Thus, the service provider 108 receives the plurality of sound signals from the internal microphone 118 and the piezoelectric sensors 120 coupled to the window 122. In these embodiments, the vehicle 102 is provided with a communications interface 126 that allows the service provider 108 and the voice command system 112 to communicate with one another over the network 110.

Figure 3:
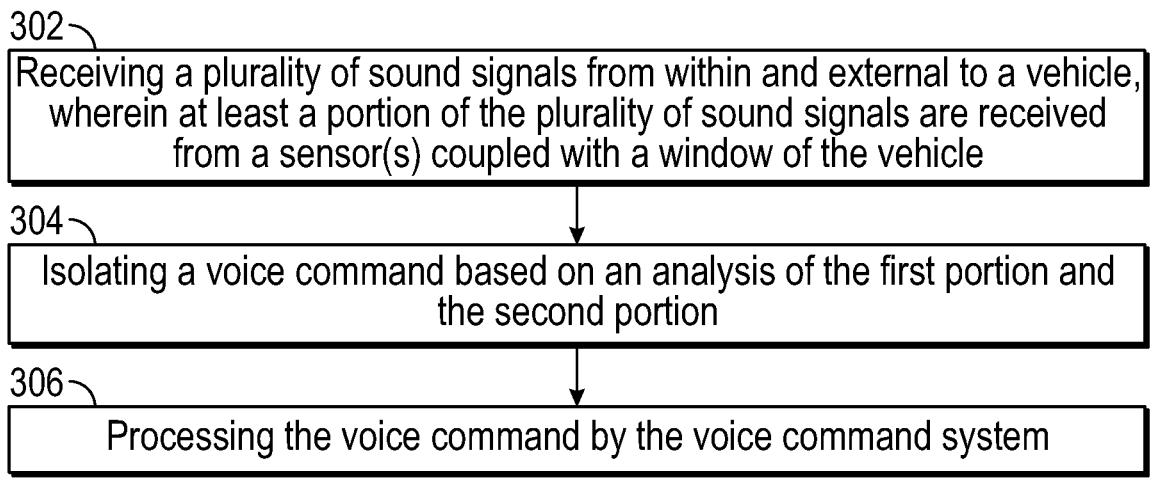
FIG. 3 is a flowchart of an example method of the present disclosure related to voice command isolation from a plurality of competing sound signals.

FIG. 3 is a flowchart of an example method of the present disclosure. The method generally includes a step 302 of receiving a plurality of sound signals from within and external to a vehicle. As noted above, a first portion of the plurality of sound signals is received using a sensor coupled with a window of the vehicle and a second portion of the plurality of sound signals is received by a microphone (e.g., internal microphone) within a cabin of the vehicle.

Next, the method includes a step 304 of isolating a voice command based on an analysis of the first portion and the second portion. This process can be performed using cross-correlation to subtract competing speech produced by a user within the vehicle from a voice command received from a user who is external to the vehicle. As noted above, a similar process can be used to isolate a voice command produced within the vehicle from external competing speech. According to some embodiments, after the voice command is isolated, the method includes a step 306 of processing the voice command by the voice command system. As noted above, this process can include determining common data received by both the microphone and the piezoelectric sensors. This common data is removed and the data that remains includes the voice command.

Figure 4:
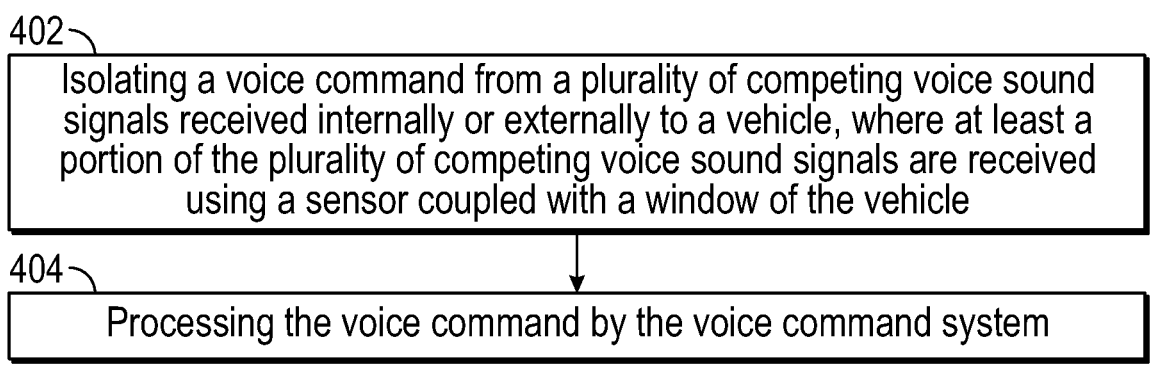
FIG. 4 is a flowchart of an example method of the present disclosure related to voice command isolation from a plurality of competing sound signals.
Figure 5:
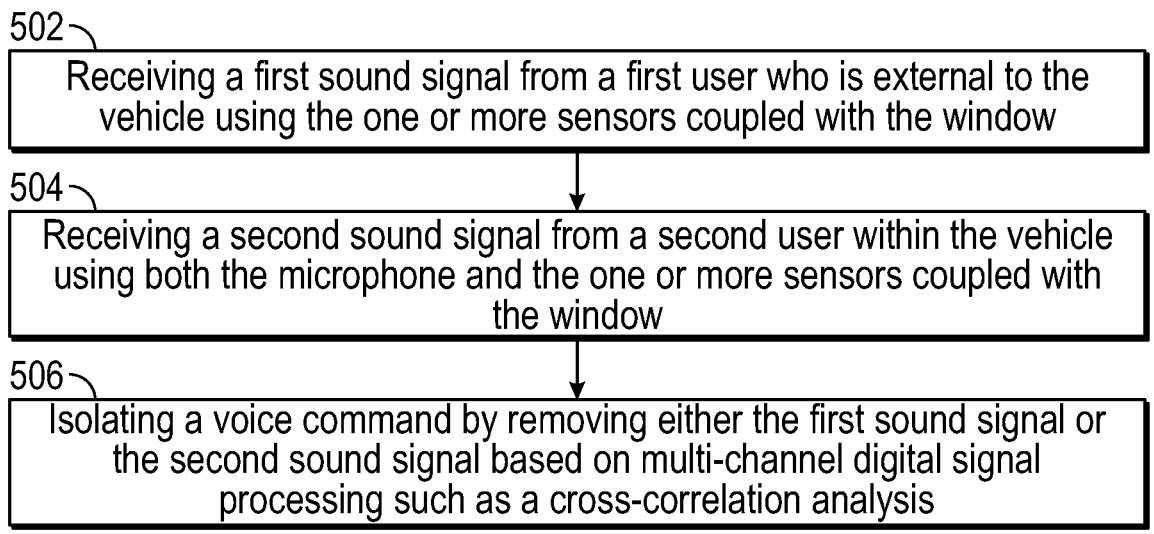
FIG. 5 is a flowchart of an additional example method of the present disclosure related to voice command isolation from a plurality of competing sound signals.

FIG. 4 is another flowchart of an example method of the present disclosure. The method includes a step 402 of isolating a voice command from a plurality of competing sound signals received internally or externally to a vehicle. As noted throughout, the plurality of competing sound signals are received using a sensor coupled with a window of the vehicle, as well as a microphone within the vehicle cabin. Next, the method includes a step 404 of processing the voice command by the voice command system. To be sure, the isolation performed can include applying a cross-correlation analysis to detect common data in the plurality of competing sound signals. Data that is not common may be isolated and determined as the voice command. FIG. 5 is a flowchart of an example method of the present disclosure. The method includes a step 502 of receiving first sound signals from a first user who is external to the vehicle using the one or more sensors coupled with the window. Next, the method includes a step 504 of receiving second sound signals from a second user within the vehicle using both the microphone and the one or more sensors coupled with the window. To be sure, the second sound signals compete with the first sound signals and effectively create noise that prevents a voice command system from properly identifying and responding to a voice command. In one embodiment, the method includes a step 506 of isolating a voice command by removing either the first sound signals or the second sound signals based using multi-channel digital signal processing a cross-correlation analysis.

In various embodiments, when the first sound signals are indicatively of the voice command, the first sound signals are isolated from the second sound signals by a processor removing common data received from the microphone and the one or more sensors coupled with the window. In another embodiment, when the second sound signals are indicatively of the voice command, the first sound signals are removed from the second sound signals by the processor isolating common data received from the microphone and the one or more sensors coupled with the window and removing non-common data.

As noted above, in some embodiments, the voice command is utilized to authenticate the first user who is external to the vehicle to allow the first user to enter the vehicle. This is advantageous in embodiments such as when a user wishes to enter an automated vehicle, but other competing voices (e.g., users within the vehicle) are creating competing speech.

EXAMPLE EMBODIMENTS

In some instances, the following examples may be implemented together or separately by the systems and methods described herein.

Example 1 may include a method, comprising: receiving a plurality of sound signals from within and external to a vehicle, wherein a first portion of the plurality of sound signals is received using a sensor associated with a window of the vehicle, and wherein a second portion of the plurality of sound signals is received by a microphone within a cabin of the vehicle; and isolating a voice command from the plurality of sound signals based on an analysis of the first portion and the second portion.

Example 2 may include the method according to example 1 and/or some other example herein, wherein the voice command is received from a user within the vehicle.

Example 3 may include the method according to example 1 and/or some other example herein, wherein the voice command is received from a user external to the vehicle.

Example 4 may include the method according to example 1 and/or some other example herein, further comprising using multi-channel digital signal processing to remove common data between the first portion and the second portion.

Example 5 may include the method according to example 4 and/or some other example herein, wherein the multi-channel digital signal processing comprises a cross-correlation analysis that detects common data in the first portion and the second portion, wherein data that is not common between the first portion and the second portion is determined as the voice command.

Example 6 may include the method according to example 1 and/or some other example herein, wherein the sensor comprises one or more piezoelectric sensors coupled to the window.

Example 7 may include the method according to example 1 and/or some other example herein, further comprising processing the voice command by a voice command system.

Example 8 may include a method, comprising: isolating a voice command from a plurality of sound signals received internally and externally to a vehicle, wherein at least a portion of the plurality of sound signals are received using a sensor associated with a window of the vehicle; and processing the voice command by a voice command system.

Example 9 may include the method according to example 8 and/or some other example herein, further comprising applying a cross-correlation analysis to detect common data in the plurality of sound signals, wherein data that is not common is determined as the voice command.

Example 10 may include the method according to example 8 and/or some other example herein, wherein the sensor comprises one or more piezoelectric sensors coupled to the window.

Example 11 may include the method according to example 8 and/or some other example herein, wherein the voice command is received from a user within the vehicle.

Example 12 may include the method according to example 8 and/or some other example herein, wherein the voice command is received from a user external to the vehicle.

Example 13 may include a system, comprising: one or more sensors associated with a window of a vehicle; a microphone disposed within the vehicle; a processor; and a memory for storing executable instructions, the processor configured to execute the instructions to: receive first sound signals from a first user who is external to the vehicle using the one or more sensors; receive second sound signals from a second user within the vehicle using both the microphone and the one or more sensors; and isolate a voice command by removing either the first sound signals or the second sound signals.

Example 14 may include the system according to example 13 and/or some other example herein, wherein the processor is configured to execute the instructions to process the voice command by a voice command system.

Example 15 may include the system according to example 13 and/or some other example herein, wherein when the first sound signals are the voice command, the first sound signals are isolated from the second sound signals by the processor by removing common data received from the microphone and the one or more sensors.

Example 16 may include the system according to example 15 and/or some other example herein, wherein when the second sound signals are the voice command, the first sound signals are removed from the second sound signals by the processor by isolating common data received from the microphone and the one or more sensors and removing non-common data.

Example 17 may include the system according to example 16 and/or some other example herein, wherein the voice command is utilized to authenticate the first user who is external to the vehicle to allow the first user to enter the vehicle.

Example 18 may include the system according to example 17 and/or some other example herein, wherein the processor is configured to isolate the voice command based on an analysis of the first sound signals and the first sound signals using multi-channel digital signal processing which comprises a cross-correlation analysis.

Example 19 may include the system according to example 18 and/or some other example herein, wherein the cross-correlation analysis is configured to detect common data obtained using the microphone and the one or more sensors, wherein data that is not common is determined to be the voice command.

Example 20 may include the system according to example 19 and/or some other example herein, wherein the one or more sensors comprise one or more piezoelectric sensors coupled to the window.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
    receiving a plurality of sound signals from within and external to a vehicle during a same time period, wherein a first portion of the plurality of sound signals is received using a glass microphone associated with a window of the vehicle, and wherein a second portion of the plurality of sound signals is received by a microphone within a cabin of the vehicle, wherein the first portion of the plurality of sound signals originates from both an interior and an exterior of the vehicle; and
    isolating a voice command from the plurality of sound signals based on an analysis of the first portion and the second portion, wherein a location from which the voice command is received is identified based on a comparison of the first portion and the second portion.

2. The method according to claim 1, wherein the voice command is received from a user within the vehicle.

3. The method according to claim 1, wherein the voice command is received from a user external to the vehicle.

4. The method according to claim 1, further comprising using multi-channel digital signal processing to remove common data between the first portion and the second portion.

5. The method according to claim 4, wherein the multi-channel digital signal processing comprises a cross-correlation analysis that detects common data in the first portion and the second portion, wherein data that is not common between the first portion and the second portion is determined as the voice command.

6. The method according to claim 1, wherein the glass microphone further sensor comprises one or more piezoelectric sensors coupled to the window.

7. The method according to claim 1, further comprising processing the voice command by a voice command system.

8. A method, comprising:
isolating a voice command from a first plurality of sound signals received internally and externally to a vehicle, wherein at least a portion of the first plurality of sound signals are received using a glass microphone associated with a window of the vehicle, wherein the first plurality of sound signals are received during a same time period, and wherein a location from which the voice command is received is identified based on a comparison of the first plurality of sound signals and a second plurality of sound signals received internally by a microphone within a cabin of the vehicle; and
processing the voice command by a voice command system.

9. The method according to claim 8, further comprising applying a cross-correlation analysis to detect common data in the first plurality of sound signals, wherein data that is not common is determined as the voice command.

10. The method according to claim 8, wherein the glass microphone further comprises one or more piezoelectric sensors coupled to the window.

11. The method according to claim 8, wherein the voice command is received from a user within the vehicle.

12. The method according to claim 8, wherein the voice command is received from a user external to the vehicle.

13. A system, comprising:
a glass microphone associated with a window of a vehicle;
a microphone disposed within the vehicle;
at least a processor; and
a memory for storing executable instructions, at least the processor configured to execute the instructions to:
receive first sound signals from a first user who is external to the vehicle using the glass microphone;
receive second sound signals from a second user within the vehicle using both the microphone and the glass microphone, wherein the first sound signals and the second sound signals are received during a same time period; and
isolate a voice command by removing either the first sound signals or the second sound signals, wherein a location of the first user and the second user is identified based on a comparison of the first sound signals and the second sound signals.

14. The system according to claim 13, wherein the processor is configured to execute the instructions to process the voice command by a voice command system.

15. The system according to claim 13, wherein when the first sound signals are the voice command, the first sound signals are isolated from the second sound signals by the processor by removing common data received from the microphone and the one or more sensors.

16. The system according to claim 15, wherein when the second sound signals are the voice command, the first sound signals are removed from the second sound signals by the processor by isolating common data received from the microphone and the one or more sensors and removing non-common data.

17. The system according to claim 16, wherein the voice command is utilized to authenticate the first user who is external to the vehicle to allow the first user to enter the vehicle.

18. The system according to claim 17, wherein the processor is configured to isolate the voice command based on an analysis of the first sound signals and the first sound signals using multi-channel digital signal processing which comprises a cross-correlation analysis.

19. The system according to claim 18, wherein the cross-correlation analysis is configured to detect common data obtained using the microphone and the one or more sensors, wherein data that is not common is determined to be the voice command.

20. The system according to claim 19, wherein the glass microphone further comprises one or more piezoelectric sensors coupled to the window.

* * * * *